United States Patent [19]

Stone

[11] 3,851,597

[45] Dec. 3, 1974

[54] AIR BULKHEAD ASSEMBLY

[75] Inventor: Thomas G. Stone, Farmington, Mich.

[73] Assignee: Evans Products Company, Plymouth, Mich.

[22] Filed: Apr. 20, 1973

[21] Appl. No.: 352,945

[52] U.S. Cl. .......................................... 105/492
[51] Int. Cl. ............................................. B60p 7/14
[58] Field of Search ...... 105/376, 369 BA; 214/10.5

[56] References Cited
UNITED STATES PATENTS 3,718,099   2/1973   Thornton et al. ................... 105/376

Primary Examiner—M. Henson Wood, Jr.
Assistant Examiner—Gene A. Church
Attorney, Agent, or Firm—Harness, Dickey & Pierce

[57] ABSTRACT

A freight transporting system for a vehicle such as a railroad car embodying an improved, low-cost air bulkhead assembly for holding and bracing the freight during shipment. The air bulkhead assembly does not include a locking mechanism for holding it in position when it braces freight. A light weight locking mechanism is provided, however, for locking the bulkhead assembly in position adjacent one end wall of the car during return shipment when the car is empty. This locking arrangement holds the bulkhead assembly against movement and damage under the aforenoted empty car condition.

5 Claims, 2 Drawing Figures

3,851,597

AIR BULKHEAD ASSEMBLY

BACKGROUND OF THE INVENTION

This invention relates to a bracing system for a freight transporting vehicle and particularly to a simplified and improved air bulkhead assembly.

The use of air bulkhead assemblies in the bracing of transported freight has recently gained considerable commercial acceptance. These bulkhead assemblies are particularly useful in bracing freight since air bags are employed to hold the freight load to apply a force to it that tends to fill up voids that occur during shipment. Most of the presently used commercial air bulkheads employ one panel that carries a locking mechanism for locking that panel in a preselected bracing position in the transporting vehicle. Another panel, normally called a "floater," is supported for movement relative to the locking panel and is urged into engagement with the freight load by air bags. Such bulkhead assemblies, as have been noted, have gained considerable commercial acceptance. The locking mechanism of the bulkhead assembly must, however, be sufficiently strong so as to resist the impact loadings that occur during shipment. These locking mechanisms and their associated operating structure add considerable cost to the bulkhead assembly.

It has been proposed to employ air bulkhead assemblies in which neither panel carries a locking mechanism for holding it in a bracing position. Such arrangements have the advantage that each panel may resiliently hold a respective freight loading unit. This type of bulkhead has particular utility for certain types of shippers who normally provide a full carload of freight. A bulkhead assembly of this type that has no locking mechanism, however, lacks any means for preventing movement of the bulkhead assembly along the length of the car when the car is being returned empty or only partially loaded. Under such conditions, the bulkhead can impact itself against the partial load unit or against a car end wall. Considerable damage will obviously result.

It is, therefore, a principal object of this invention to provide an improved and simplified air bulkhead assembly.

It is another object of this invention to provide a simplified air bulkhead assembly that includes a light weight locking structure for holding it in position during empty or partial load shipment.

SUMMARY OF THE INVENTION

This invention is adapted to be embodied in a bracing system for a freight transporting vehicle having a cargo receiving area. The bracing system includes a bulkhead assembly and means for supporting the bulkhead assembly for movement along the cargo area to selective freight bracing positions. Locking means are confined to a portion of the vehicle cargo area for locking the bulkhead assembly against substantial movement within the cargo area when the bulkhead assembly is not being employed to brace freight.

DETAILED DESCRIPTION OF THE PREFERRED EMBODIMENTS

Figure 1:
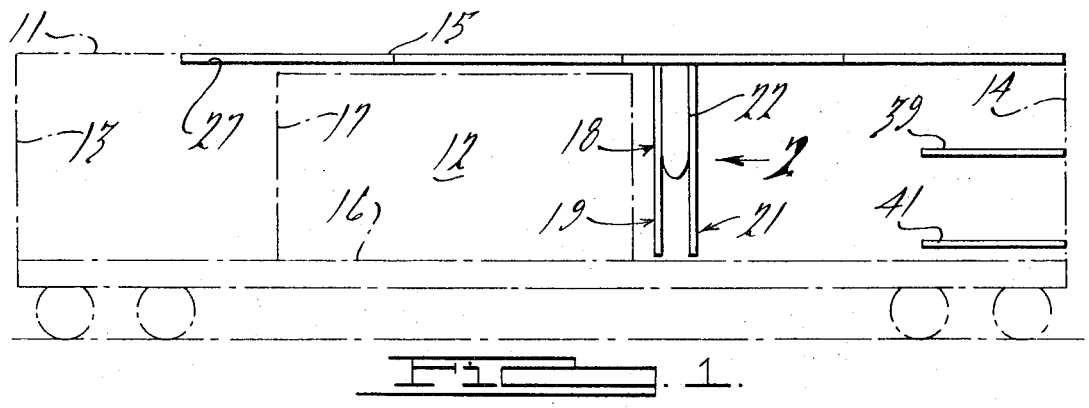
FIG. 1 is a side elevational view of a railroad box car embodying the invention, with portions of the car being shown in phantom.

FIG. 1 illustrates schematically a railroad box car embodying this invention. The box car is shown primarily in phantom lines and is identified generally by a reference numeral 11. As is normal with such cars, a cargo area 12 is defined by end walls 13 and 14, a roof structure 15, floor structure 16 and side walls in which doorway openings 17 are provided. Any form of conventional door, not shown, may be embodied for closing the doorway opening 17.

Figure 2:
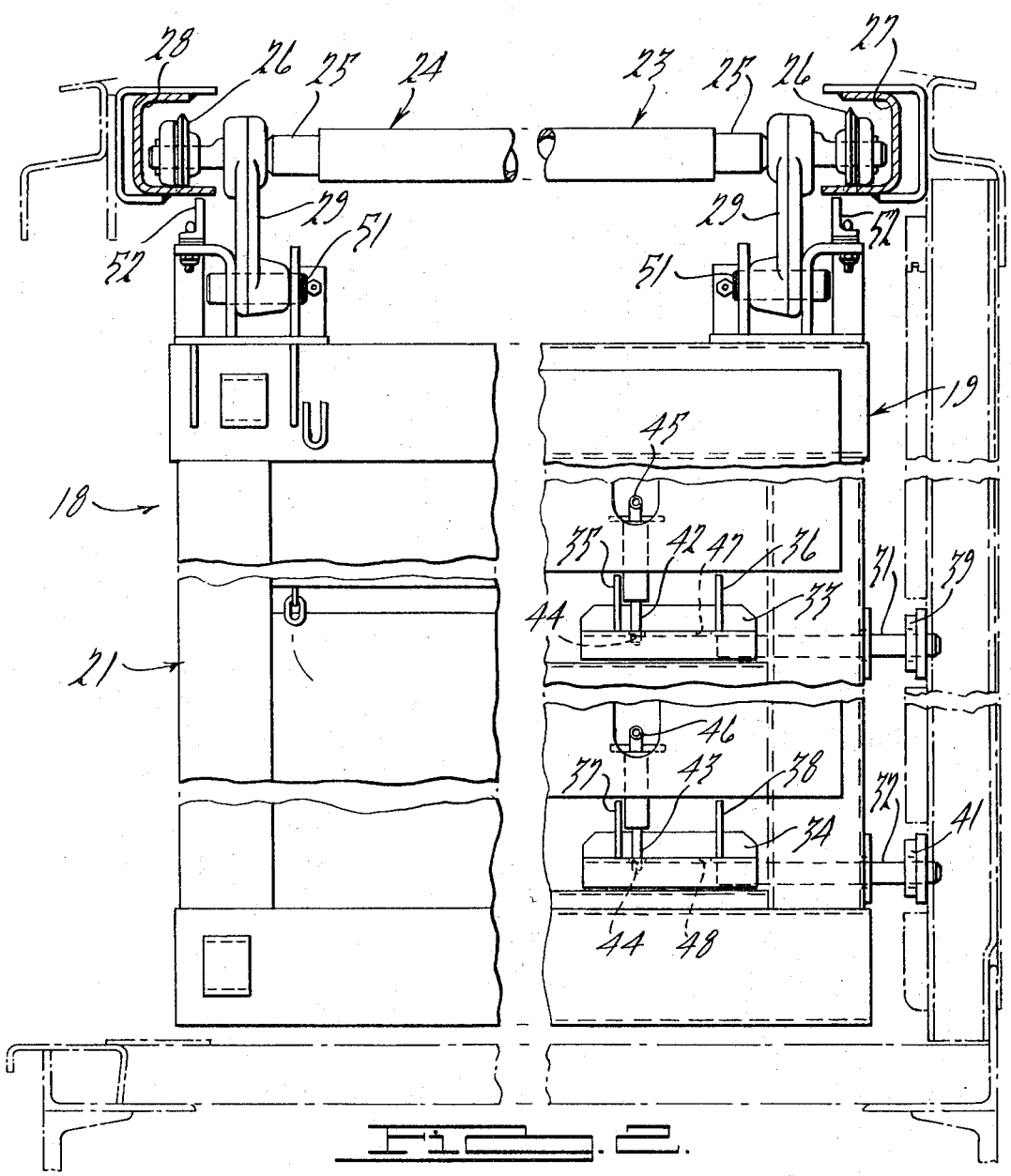
FIG. 2 is an enlarged transverse cross-sectional view taken along two different planes showing the bulkhead assembly in a locked position and is taken generally in the direction of the arrow 2 in FIG. 1.

An air bulkhead assembly embodying this invention is identified generally by the reference numeral 18 and shown in most detail in FIG. 2, is positioned in the car 11. The air bulkhead assembly 18 is comprised of first and second panels 19 and 21 between which are positioned one or more air bags 22. The degree of the inflation of the air bags 22 determines the spacing between the panels 19 and 21, as will become more apparent. Except as will be hereinafter noted, the panels 19 and 21 are identical in construction. The panel 21 is shown at the left hand side of FIG. 2 and the panel 19 is shown at the right hand side of this Figure. The panels 19 and 21 are symetric from side to side and for this reason only one side of each panel is illustrated in FIG. 2.

Each of the panels 19 and 21 is suspended from a respective overhead trolley structure 23 and 24. Each of the trolley structures 23 and 24 is identical in construction and includes a timing shaft 25 to which sprocket wheels 26 are keyed at its opposite ends. The sprocket wheels 26 cooperate with overhead tracks 27 and 28 that are affixed in any known manner to the car structure 11. Hanger structures 29 depend from the opposite ends of the timing shaft 25 and are pivotally connected by pivot pins 51 to the opposite sides of the respective panel 19, 21. This pivot connection may be provided by an eccentric bearing so as to permit adjustment, if desired. Furthermore, safety devices 52 may be affixed to the upper corners of the panels 19 and 21 contiguous to the underside of the tracks 27 and 28 so as to prevent the sprocket wheels 26 from becoming disengaged from the tracks 27 and 28.

With the aforedescribed construction it should be readily apparent that the bulkhead assembly 18 may be rolled along the length of the cargo area 12 to selected bracing positions between freight load units (not shown) positioned between the respective end walls 13 and 14 and the center of the car 11. The adjacent faces of the freight loads will be positioned at a distance from each other less than the maximum spacing permitted between the panels 19 and 21 by full inflation of the air bags 22. The air bags 22 are then inflated to bring the panels 19 and 21 into engagement with the respective freight load faces. The desired degree of inflation may be readily controlled as is well known in the art. The means for inflating the air bags 22 has not been shown since it may be of conventional construction.

The air bulkhead assembly of the type described may be utilized in the automotive industry where the cars 11 are normally fully loaded with special racks carying automotive parts. However, in this type of service the cars 11 are frequently returned to their destination point in an empty or only lightly loaded condition. In such instance, the bulkhead assembly 18 would be free to roll along the tracks 27 and 28 and to impact itself against the car end walls 13 and 14 or the partial load within the car. To prevent this, a structure, now to be described, is provided for locking the bulkhead assembly 18 contiguously to one of the end walls 13 or 14, in this case the end wall 14.

The locking structure is comprised of four locking pins comprised of two pairs of pins 31 and 32 slidably supported at the opposite edges of the panel 19. The locking pins 31 and 32 are slidable along a horizontal axis and have generally Z shaped plates 33 and 34 affixed to their inner ends. These Z shaped plates 33 and 34 are received in pockets formed in the face of the panel 19 so as to hold the pins 31 and 32 against substantial rotation. Up standing plates 35, 36 and 37, 38 are affixed to each plate 33 and 34, for a reason which will become apparent. The locking pins 31 and 32 are slideable between a locked position, as shown in FIG. 2, and a released position. In their locked position the pins 31 and 32 are adapted to interengage with holes formed in respective locking plates 39 and 41 affixed to the adjacent side wall of the car 11. As is shown in FIG. 1, the locking plates 39 and 41 extend from the end wall 14 for a predetermined but relatively short distance into the cargo area 12.

The locking pins 31 and 32 are held in their locked position by means of latch pins 42 and 43 that are supported for reciprocation about an axis that is transverse to the axis of the pins 31 and 32. The pins 42 and 43 are adapted to be received in holes 44 formed in the plates 33 and 34 and in the locking pins 31 and 32 in the area between the plates 35 and 37. The latch pins 42 and 43 have release handles 45 and 46 that are accessible from the face of the panel 19 toward the center of the car so as to withdraw the respective pins from the holes 44. When so withdrawn the pins 31 and 32 may be slid to a release position by grasping the plates 33 or 34. In this released position, the plates 36 and 38 are closely adjacent the latch pins 42 and 43. The latch pins 42 and 43 may then be moved into registry with openings 47 and 48 formed in the plates 33 and 34 and in the locking pins 31 and 32. When so received, the locking pins 31 and 32 will be held in a released position so as to permit normal operation of the bulkhead assembly 18 as previously described.

It will be noted from FIG. 1 that the tracks 27 and 28 extend from a point remote from the end wall 13 to a point closely adjacent the end wall 14. If there is no load whatsoever in the car 11 the panel 21 may be moved into register with the end wall 14 and the panel 19 moved as close to the panel 21 as the deflated air bags 22 will permit. The panel 19 is then locked in this position by its pair of locking pins 31 and 32.

The construction also permits the locking of the bulkhead assembly 18 in position against a partial load. For example, the car 11 may be returned to its shipping point with a load of empty pallets. These pallets may be stacked adjacent the end wall 14 and the bulkhead assembly 19 locked in place against the stacked pallets.

The length of the pairs of tracks 39 and 41 is chosen to suit the desired application. As has been noted, the tracks 39 and 41 have a plurality of spaced apertures so as to permit the bulkhead assembly 18 to be locked in any of a plurality of positions relative to the end wall 14. It should be noted, however, that the locking structure carried by the panel 19 is not sufficiently strong as to resist impact loads of the magnitude encompassed when a heavy freight load is carried in the car 11. Said another way, the locking pins 31 and 32 are only sufficiently strong so as to hold some very small partial load against movement. In this way a simple and low cost locking structure may be used that does not add significant cost to the assembly.

It is to be understood that the foregoing description is that of a preferred embodiment of the invention and that the invention is susceptible of change and modification within its spirit and scope as defined by the appended claims.

I claim:

1. A bracing system for a freight transporting vehicle having a cargo receiving area, said bracing system comprising a bulkhead assembly, said bulkhead assembly comprising first and second panels and inflatable air bag means interposed between said panels for varying the space therebetween, means for supporting said bulkhead assembly for movement along the cargo area to selective freight bracing positions, said bulkhead assembly being normally adapted to be positioned between respective freight load units with the panels each engaged with a respective freight load unit for retaining the load units against substantial movement, said air bag means being inflated during such use for urging the panels resiliently into engagement with the respective load units, locking means confined to a portion of said vehicle cargo area for locking said bulkhead assembly against substantial movement within said cargo area when said bulkhead assembly is not being used to brace freight.

2. A bracing system as set forth in claim 1 wherein the locking means comprises locking means carried by said bulkhead assembly and coperating locking means carried by said freight transport vehicle.

3. A bracing system as set forth in claim 2 wherein the locking means carried by the bulkhead assembly is not sufficiently strong to resist impact loads transmitted by transported freight to the bulkhead assembly.

4. A bracing system as set forth in claim 2 wherein the locking means carried by the bulkhead assembly comprises slidably supported pins and the cooperating locking means comprises longitudinally extending tracks affixed to the freight transporting vehicle.

5. A bracing system as set forth in claim 1 wherein the locking means is confined to a portion of the vehicle cargo area in which the bulkhead assembly is not normally positioned when transporting freight.

* * * * *